(12) United States Patent
Rhodes

(10) Patent No.: US 11,873,422 B2
(45) Date of Patent: Jan. 16, 2024

(54) ADHESIVE COMPOSITION

(71) Applicant: HEXCEL COMPOSITES LIMITED, Duxford (GB)

(72) Inventor: Michael Rhodes, Haverhill (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 400 days.

(21) Appl. No.: 17/297,387

(22) PCT Filed: Dec. 3, 2019

(86) PCT No.: PCT/EP2019/083490
§ 371 (c)(1),
(2) Date: May 26, 2021

(87) PCT Pub. No.: WO2020/115041
PCT Pub. Date: Jun. 11, 2020

(65) Prior Publication Data
US 2022/0017797 A1    Jan. 20, 2022

(30) Foreign Application Priority Data
Dec. 4, 2018   (GB) ..................................... 1819791

(51) Int. Cl.
| | |
|---|---|
| *C09J 163/04* | (2006.01) |
| *C08G 59/30* | (2006.01) |
| *C08G 59/32* | (2006.01) |
| *C08G 59/40* | (2006.01) |
| *C08K 3/26* | (2006.01) |
| *C09J 5/06* | (2006.01) |
| *C08L 9/02* | (2006.01) |

(52) U.S. Cl.
CPC .......... *C09J 163/04* (2013.01); *C08G 59/306* (2013.01); *C08G 59/3281* (2013.01); *C08G 59/4021* (2013.01); *C08K 3/26* (2013.01); *C09J 5/06* (2013.01); *C08K 2003/265* (2013.01); *C08L 9/02* (2013.01); *C08L 2205/02* (2013.01); *C08L 2205/035* (2013.01); *C08L 2207/53* (2013.01); *C09J 2400/163* (2013.01); *C09J 2400/226* (2013.01); *C09J 2400/303* (2013.01)

(58) Field of Classification Search
CPC .............. C08G 59/1433; C08G 59/306; C08G 59/3218; C08G 59/3281; C08G 59/4021; C08K 2003/265; C08K 3/26; C08L 2205/53; C08L 2205/035; C08L 2207/53; C08L 63/00; C08L 63/04; C08L 9/02; C09J 163/00; C09J 163/04; C09J 2400/163; C09J 2400/226; C09J 2400/303; C09J 5/06
USPC ............ 156/330; 528/87, 103; 525/902, 523
See application file for complete search history.

(56) References Cited

U.S. PATENT DOCUMENTS

| | | | |
|---|---|---|---|
| 2007/0027233 A1* | 2/2007 | Yamaguchi ............. | C08L 63/00 523/467 |
| 2009/0005480 A1 | 1/2009 | Nakamura et al. | |
| 2011/0036497 A1* | 2/2011 | Lammerschop ....... | C09J 163/00 427/386 |
| 2011/0126980 A1* | 6/2011 | Campbell ............. | C09J 163/00 523/438 |
| 2014/0377453 A1* | 12/2014 | Park ........................ | C23C 26/00 523/400 |
| 2015/0189747 A1 | 7/2015 | Zeng | |
| 2017/0313918 A1* | 11/2017 | Kasahara ............... | C08G 59/32 |

FOREIGN PATENT DOCUMENTS

| | | |
|---|---|---|
| KR | 20150025991 A | 3/2015 |
| WO | 2015/096116 A1 | 7/2015 |

OTHER PUBLICATIONS

International Search Report (ISR) & Written Opinion (WO), issued in the parent Patent Cooperation Treaty (PCT), Application No. PCT/EP2019/083490, dated Feb. 3, 2020.
Exam Report under Section 18(3), issued in the priority United Kingdom Patent Application No. GB1819791.3, dated May 30, 2022.
Pham et al: "Epoxy Resins," Encyclopedia of Polymer Science and Technology, pp. 1-127, 732-733, 708; Jan. 1, 2004.
Lehigh Preserve et al, "The Effects of Difunctional Urone Catalysis on Selected Non-Halogenated Flame Retardant Synergies of Dicyandiamide Cured Epoxy Resins," Lehigh University, Jan. 1, 2017.

* cited by examiner

*Primary Examiner* — Philip C Tucker
*Assistant Examiner* — Brian R Slawski
(74) *Attorney, Agent, or Firm* — W. Mark Bielawski

(57) ABSTRACT

An adhesive composition comprising a silane-modified epoxy resin, a dicyclopentadiene novolac epoxy resin and a curing agent. The composition shows good oily steel bonding, even in the absence of CTBN rubber or rubber adducts as toughening agents, with good Tg values of the cured resin and good Tg retention after hot wet aging.

2 Claims, No Drawings

ADHESIVE COMPOSITION

The present invention relates to an adhesive composition, a method of bonding two surfaces with the adhesive composition, a bonded article obtainable by such a method, and the use of the adhesive composition for bonding a metal surface to a metal surface or a composite material to a metal surface. The invention is particularly concerned with adhesive bonding to oily metal surfaces found in the automotive and other sheet steel fabrication industries.

Adhesives are widely used in the automotive industry for bonding of steel, including zinc galvanized steel, to steel or steel to prepreg. Such steel surfaces can be contaminated with an oily film used as an anti-corrosion measure, or as the result of cutting, or other mechanical processes, prior to being bonded. Steel having such a surface contamination layer of oil is commonly referred to as "oily steel". Although cleaning can be carried out on the surface to be bonded, this is frequently not desirable for economic reasons, such as the need for additional steps during the manufacturing process, which can increase process complexity, process time and process cost, or all three. In some cases, cleaning of the surfaces to be bonded is not appropriate because of the desire to leave an oily film protection in place on non-bonded areas, after bonding has taken place. However, the presence of an oily film on the steel/zinc galvanized steel surface can cause problems with adhesion resulting in poor lap shear strength and/or adhesive failure at the steel/zinc interface.

In traditional automotive structure manufacture, the problem has been overcome by addition of modifiers to thermosetting adhesives that either adsorb residual oil or use surfactants to perform a chemical substrate de-oiling step as part of the cure process. Either approach uses high curing temperatures of about 180° C. and over an hour in drying ovens. These relatively high cure temperatures and long durations allow the required joining process to take place. High temperatures provide a low viscosity to enable oil transfer away from the surface. Long duration kinetically allows oil sequestration before the adhesive begins to bond to the metal substrate. This approach achieves the necessary task of curing the adhesive during a required part of the process and necessitates some mechanical fastening until the cure has taken place. Fastening can include local welding or riveting but the use of external clamping is generally considered unworkable.

The use of high temperatures and long curing periods and the need for mechanical fastening during such de-oiling processes is not always practical or desirable on an industrial scale, and there have been many other approaches to achieving good oily steel bonding under less stringent conditions.

The use of rubber-toughened acrylic adhesives to achieve good bonding to oily/waxy surfaces commonly found in the automotive industry is well-known (see, for example, *Structural acrylic adhesives for the sheet steel fabrication industry*, R. S. Charnock, International Journal of Adhesion and Adhesives, Volume 5, Issue 4, October 1985, pages 201-206). Suitable rubber tougheners include functionalized butadiene-acrylonitrile copolymers such as carboxyl-terminated butadiene-acrylonitrile (CTBN) and amine-terminated butadiene-acrylonitrile (ATBN) rubbers. In addition to improving oily steel bonding, such rubber tougheners reduce brittleness of the cured adhesive and provide resistance to crack formation, which is particularly important where the adhesives are used to replace mechanical bonds that may be subject to extreme shear stress, for example, if an automobile is involved in a crash.

Epoxy resin based adhesives are widely used for bonding various substrates because of their good bonding strength and versatility. The use of carboxyl-terminated butadiene-acrylonitrile (CTBN) rubbers in adhesive compositions containing epoxy resins and impact strength modifiers is also known to promote an increase in peel strength. U.S. Pat. No. 5,278,257, for example, discloses an adhesive composition containing (A) a copolymer based on at least one 1,3-diene and at least one polar ethylenically unsaturated co-monomer and (B) a phenol-terminated polyurethane, polyurea or polyurea-urethane or an adduct thereof. In preferred embodiments, component (A) is a copolymer based on butadiene/acrylonitrile having terminal carboxyl or amino groups.

WO2010/039614 discloses two-part adhesive compositions that have a first part and a second part, said composition comprising at least one aromatic epoxy resin in the first part; at least one amine curing agent in the second part; and at least one ester in at least one of the first and/or second part. The ester corresponds to the general formula $R^2$—CO—$OR^1$; wherein $R^1$ is an organic moiety comprising at least one of (i) at least one epoxy group or (ii) at least one acryl group and $R^2$ is a branched alkyl group. This document discloses that the structural adhesives can be used to form bonded joints between adherents having clean surfaces, as well as those having surfaces contaminated with hydrocarbon-containing materials, such as oils, processing aids and lubricating agents. In preferred embodiments, the composition further comprises 5 to 55% by total weight of a toughening agent such as a core shell rubber or a CTBN or ATBN rubber.

WO2016/191403 discloses a two part epoxy adhesive composition for bonding oily metals comprising an organic polymeric solid containing a vinyl phenol moiety. Such adhesive compositions are said to provide a strong bond to oil-contaminated metal substrates when cured at room temperature, whilst simultaneously exhibiting good impact toughness. In preferred embodiments, the first part of the composition comprises a toughening agent such as a urethane toughener or a core shell rubber.

The different approaches to oily steel bonding described above are each associated with certain disadvantages, such as the need to cure the adhesive compositions at high temperatures or for long periods of time, or to use mechanical fasteners, or to use core shell rubbers or nitrile rubbers as toughening agents, or to use adhesion modifiers to enhance impact strength, all of which can increase process complexity, time and cost. Such factors are often undesirable in the automotive and other sheet steel fabrication industries.

It is well-known that the choice of epoxy adhesives for specific applications generally involves a trade-off between various properties of the resultant adhesive. For example, epoxy resins that show excellent heat resistance often show reduced strength on dirty surfaces (see, for example, *Update on Structural and Engineering Adhesives*, David J. Dunn, ISmithers, Shrewsbury, U K, 2010, Chapter 2, Table 2.3). EP 2,799,509 discloses an insulating adhesive composition for metal-based copper clad laminate (MCCL), for use in printed circuit boards, which comprises a silane-modified epoxy resin, a curing agent and alumina. This document discloses that, in order to achieve the high thermal characteristics required for an MCCL adhesive surface, the epoxy resin may include at least one multi-functional epoxy resin including at least two multi-functional epoxy groups, and lists a number of multi-functional epoxy resins theoretically suitable for such a purpose, including phenol novolac type epoxy resins, cresol novolac type epoxy resins and dicyclopentadiene novolac type epoxy resins. However, only phenol novolac type epoxy resins are exemplified and EP 2,799,509 does not relate to the automotive or other sheet steel fabrication industries, but to the preparation of metal-based copper clad laminate for use in printed circuit board manufacture. Printed circuit boards are invariably manufactured under clean room conditions where possible contaminants, such as grease, oil, dust or dirt, that might effect the quality or function of the electronic components must be rigorously excluded. Furthermore, the epoxy adhesives disclosed in this document are said to show excellent electrical insulating properties and high thermal resistance, which would be expected to result in poor adhesion to dirty surfaces, such as oily steel.

The invention aims to overcome some of the aforesaid problems and/or to provide improvements generally, According to the present invention, there is provided an adhesive composition, a method, a bonded article, a use, a prepreg, an assembly, a blank, and a part as described hereinafter or as defined in any one of the accompanying claims.

In a first aspect, the present invention provides an adhesive composition comprising:
(a) a silane-modified epoxy resin;
(b) a dicyclopentadiene novolac epoxy resin; and
(c) a curing agent.

The silane-modified epoxy resin may be a modified epoxy resin prepared by reacting a silane compound represented by the following Chemical Formula 1 and an epoxy resin:

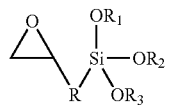

[Chemical Formula 1]

In Chemical Formula 1, R is an aliphatic or aromatic alkylene group; and $R_1$, $R_2$ and $R_3$ are independently an aliphatic or aromatic alkyl group. The use of silane-modified epoxy resins prepared from compounds of Chemical Formula 1 is described in EP 2,799,509, whose disclosure in relation to the same is hereby incorporated by reference. Silane-modified epoxy resins suitable for use in the present invention may include KSR-176, KSR-177, KSR-276, KSR-900, etc., which are commercially available from Kukdo Chemical Company Limited, Seoul, South Korea.

We have found that the adhesive compositions according to the present invention provide good bonding to oily steel or oily galvanized steel with good lap shear strengths at room and elevated temperatures, even in the absence of nitrile rubbers as toughening agents. The adhesive compositions also have desirable glass transition temperatures (peak loss modulus, E" Tg) which show good E" Tg retention after hot wet aging.

In an embodiment, the silane-modified epoxy resin is a difunctional epoxy resin. For example, the epoxy resin may be a silane-modified epoxy resin based on a diglycidyl ether of bisphenol A or bisphenol F. In a further embodiment, the silane-modified epoxy resin is a multifunctional epoxy resin. Higher functionality provided by difunctional or multifunctional silane-modified epoxy resins may be useful in improving performance for specific applications of the adhesive composition.

In a further embodiment, the silane-modified epoxy resin is an alkoxy- or arylalkoxysilane-modified epoxy resin. For example, in Chemical Formula 1, R may be selected from the group consisting of $C_1$ to $C_{20}$ alkylene group, arylene group, arylalkylene group, and alkylarylene group; and $R_1$, $R_2$ and $R_3$ may each independently be selected from the group consisting of $C_1$ to $C_{20}$ alkyl group, aryl group, arylalkyl group, and alkylaryl group.

The reactivity of an epoxy resin is indicated by its epoxy equivalent weight (EEW): the lower the EEW, the higher the reactivity. The epoxy equivalent weight can be calculated as follows: (Molecular weight epoxy resin)/(Number of epoxy groups per molecule). Another way is to calculate with epoxy number that can be defined as follows: Epoxy number=100/epoxy equivalent weight. To calculate epoxy groups per molecule: (Epoxy number×molecular weight)/100. To calculate molecular weight: (100×epoxy groups per molecule)/epoxy number. To calculate molecular weight: epoxy equivalent weight×epoxy groups per molecule.

In an embodiment, the silane-modified epoxy resin has an EEW of 170 to 1,000 grams/equivalent (g/eq). Preferably, the silane-modified epoxy resin has an EEW of 170 to 700 g/eq. In further embodiments, the silane-modified epoxy resin has an EEW in the range of 190 to 220 g/eq, 240 to 270 g/eq, 450 to 500 g/eq or 600 to 700 g/eq, or any combination thereof.

In another embodiment, the silicon content is in the range of 0.3 to 3 wt % with respect to the total weight of the silane-modified epoxy resin. In further embodiments, the silicon content is in the range of 0.3 to 2.5 wt %, 0.3 to 2.25 wt %, 0.3 to 2.0 wt %, 0.3 to 1.75 wt % or 0.3 to 1.50 wt %, or any combination thereof.

In an embodiment, the silane-modified epoxy resin is present in an amount of 1 to 15% by weight based on the total weight of the composition. In further embodiments, the silane-modified epoxy resin is present in an amount of 3 to 12%, 4 to 10%, 4 to 8%, or 5 to 7.5% by weight based on the total weight of the composition, or any combination thereof.

The dicyclopentadiene novolac epoxy resins used in the present invention are commercially available from a number of specialist suppliers. These include but are not limited to KDCP-130, KDCP-150 and KDCP-130EK80, which are available from Kukdo Chemical Company Limited, Seoul, South Korea, or XD1000, which is available from Nippon Kayaku, KK, Tokyo, Japan.

In an embodiment, the dicyclopentadiene novolac epoxy resin has an EEW of 200 to 300 g/eq. In further embodiments, the dicyclopentadiene novolac epoxy resin has an EEW in any one of the ranges of 230 to 290 g/eq, 240 to 270 g/eq, 240 to 260 g/eq or 245 to 255 g/eq, or any combination thereof. In one embodiment. the dicyclopentadiene novolac epoxy resin has an epoxy equivalent weight of approximately 245 to 260 g/eq The dicyclopentadiene novolac epoxy resins are generally solid at room temperature. In further embodiments, the dicyclopentadiene novolac epoxy resin has a softening point in any one of the ranges of 60 to 90° C., 65 to 75° C., 68 to 78° C., 75 to 85° C. or 79 to 81° C., or any combination thereof.

In an embodiment, the dicyclopentadiene novolac epoxy resin is present in an amount of 20 to 60% by weight based on the total weight of composition. In further embodiments, the dicyclopentadiene novolac epoxy resin is present in an amount of 25 to 55%, 25 to 50%, or 30 to 45% based on the total weight of the composition, or any combination thereof.

The curing agent used in the present invention may be any single curing agent commonly used in connection with epoxy adhesives or any combination of curing agents. In an embodiment, the curing agent is an amine or a latent amine curing agent. The amines may be aliphatic, cycloaliphatic, aromatic, or aromatic structures having one or more amino moieties. Exemplary amine curing agents include ethylenediamine, diethylenediamine, diethylenetriamine, triethylenetetramine, propylenediamine, tetraethylenepentamine, hexaethyleneheptamine, hexamethylene diamine, cyanoguanidine, 2-methyl-1,5-pentamethylene diamine, 4,7,10-trioxatridecan-1,13-diamine, aminoethylpiperazine, and the like. Exemplary curing agents include dicyanopolyamides, such as dicyandiamide (DICY). 4,4'-diaminodiphenylsulfone (4,4'-DDS) or 3,3'-diaminodiphenyl (3,3'-DDS) can also be beneficially employed as a latent amine curing agent, as well as mixtures of DICY and DDS. Dihydrazides such as adipic acid dihydrazide (ADH), isophthalic dihydrazide (IDH) and Polyamines such as Ancamine® 2441 (Evonic Resource Efficiency GmbH, Marl, Germany) and boron trifluoride monoethylamine (BF3-MEA) complexes such as Anchor 1040 (Air Products Limited, Walton on Thames, Surrey, United Kingdom) are also suitable as a latent curing agent.

In another embodiment, the curing agent is a mixture of a urea based curing agent component in combination with an imidazole curing agent component. The imidazole curing agent may be an imidazole compound or an imidazole adduct. Suitable imidazole curing agent may be selected from one or more of the following components: 2-methylimidazole, 2-undecylimidazole, 2-heptadecylimidazole, 1,2-dimethylimidazole, 2-ethyl-4-methylimidazole, 2-phenylimidazole, 2-phenylimidazole, 2-phenyl-4-methylimidazole, 1-benzyl-2-methylimidazole, 1-benzyl-2-phenyl imidazole, 1-cyanoethyl-2-methylimidazole, 1-cyanoethyl-2-undecylimidazole, 1-cyanoethyl-2-ethyl-4-methylimidazole, 1-cyanoethyl-2-phenyl imidazole, 1-cyanoethyl-2-undecylimidazolium-trimellitate, 1-cyanoethyl-2-phenyl imidazol ium-trimellitate, 2,4-diamino-6-[2'-methylimidazolyl-(1')]-ethyl-s-triazine, 2,4-diamino-6-[2'-methylimidazolyl-(1')]-ethyl-s-triazine, 2,4-diamino-6-[2'-undecylimidazolyl-(1')]-ethyl-s-triazine powder, 2,4-diamino-6-[2'-ethyl-4'-methylimidazolyl-(1')]-ethyl-s-triazine, 2,4-diamino-6-[2'-methylimidazolyl-(1')]-ethyl-s-triazineisocyanuric acid adduct dehydrate, 2,4-diamino-6-[2'-methylimidazolyl-(1')]-ethyl-s-triazineisocyanuric acid adduct dehydrate, 2-phenylimidazoleisocyanuric acid adduct, 2-phenyl-4,5-dihydroxymethylimidazole, 2-phenyl-4-methyl-5-hydroxymethylimidazole, 2,3-dihydro-1H-pyrrolo[1,2-a], 1-dodecyl-2-methyl-3-benzylimidazolium chloride, 2-phenylimidazoline-2,4-diamino-6-vinyl-1,3,5-triazine, 2,4-diamino-6-vinyl-1,3,5-triazineisocyanuric acid adduct, or 2,4-diamino-6-methacryloyloxyethyl-1,3,5-triazine.

In an embodiment, the curing agent or agents may be isolated from the other components of the adhesive composition. Isolation can be achieved by separating the curing agent or agents from the remainder of the resin, or by encapsulating the curing agent to prevent direct contact of the curing components of the curing agents with the remainder of the resin matrix. In an embodiment the curing agent is impregnated into the tows of a fibrous reinforcement, whilst the remainder of the resin is applied to an outer face of the fibrous reinforcement.

In an embodiment, the curing agent is present in an amount of 1 to 10% by weight based on the total weight of the composition. In further embodiments, the curing agent is present in an amount of 2 to 9%, 3 to 8%, 4 to 7% or 5 to 6% by weight based on the total weight of the composition, or any combination thereof.

In another embodiment, the adhesive composition according to the present invention further comprises an accelerator. The accelerator may be a urone type accelerator based on substituted urea. Suitable urea based materials include the range of materials available under the name DYHARD® from Alzchem Group AG, Trostberg, Germany, and urea derivatives such as the ones commercially available as UR200, UR300, UR400, UR600 and UR700. In an embodiment, the urone accelerator is 4,4'-methylenediphenylene bis(N,N-dimethyl urea), CAS No. 10097-09-3, which is commercially available under the trade name Omicure® U52 M from Emerald Performance Materials, Moorefield, N.J., USA.

The adhesive composition may further comprise a toughening agent. In one embodiment, the toughening agent comprises a core-shell rubber, such as the core-shell rubbers produced by Kaneka Corporation, Tokyo, Japan, under the trade name Kane Ace® or Kane Ace MX®. Examples of such core shell rubbers include Kane Ace® MX-150, MX-153, MX-154, MX-257, MX-134, MX-135, MX-136, MX-139, MX-267, MX-215, MX-217, MX-236, MX-550, MX-551 and MX553, which are all epoxy-resin based. The core-shell rubber may be present in an amount of 5 to 30% by weight based on the total weight of the composition. In further embodiments, the core-shell rubber is present in an amount of 10 to 30%, 15 to 30%, or 20 to 30% by weight based on the total weight of the composition, or any combination thereof.

In another embodiment, the toughening agent comprises a nitrile rubber or nitrile rubber adduct. Suitable rubber tougheners include functionalized butadiene acrylonitrile copolymers such as carboxyl-terminated butadiene-acrylonitrile (CTBN) and amine-terminated butadiene-acrylonitrile (ATBN) rubbers or rubber adducts. Exemplary CTBN or ATBN rubbers are available under the trade names Struckol® Polydis® 3604, 3611, 3614 and 3619, from Schill and Seilacher "Struktol" GmbH, Hamburg, Germany. The nitrile rubber may be present in an amount of 1 to 10% by weight based on the total weight of the composition. In further embodiments, the nitrile rubber is present in an amount of 2 to 6%, or 3 to 5% by weight based on the total weight of the composition, or any combination thereof.

We have found that the adhesive composition according to the present invention provides good bonding to oily steel or oily galvanized steel with good lap shear strengths at room and elevated temperatures, even in the absence of nitrile rubbers as toughening agents. However, the inclusion of small amounts of such materials may provide other benefits, such as increased resistance to crack formation.

In an embodiment, the adhesive composition further comprises an oil absorbent. The oil absorbent may comprise an epoxy component or resin having a linear aliphatic non-polar adduct. In an embodiment, the oil absorbent may comprise an epoxy nitrile rubber adduct of the kind hereinbefore described. In another embodiment, the oil adsorbent comprises an inorganic filler. The size of the particles of the inorganic filler may range from 50 microns to 500 microns, preferably from 100 to 200 microns. One preferred inorganic filler is $CaCO_3$, which can provide additional oil absorbency due to its porous microstructure. Suitable $CaCO_3$ fillers are available under the trade name Minfil® from Omya UK Limited, Steeple Morden, Royston, Hertfordshire, United Kingdom. In other embodiments, the oil absorbent may include silicas, fumed silicas, kaolin clays, or absorbent polymers such as polypropylene, polyethylene and polyvinyls. The oil absorbent may be present in an amount of 1 to 10% by weight based on the total weight of the composition, preferably in an amount of 5 to 10% by weight based on the total weight of the composition.

In another embodiment, the adhesive composition comprises by total weight of the composition:
(a) 1 to 15% silane-modified epoxy resin;
(b) 20 to 60% dicyclopentadiene novolac epoxy resin; and
(c) 1 to 10% curing agent.

The adhesive composition may further comprise at least one toughening agent in an amount of 1 to 40% by weight based on the total weight of the composition. In an embodiment, the composition comprises 5 to 30% by weight core shell rubber and/or 1-10% by weight nitrile rubber-modified epoxy resin, based on the total weight of the composition.

In an embodiment, the adhesive composition comprises by total weight of the composition:
(a) 1 to 15% silane modified epoxy resin;
(b) 20 to 60% dicyclopentadiene novolac epoxy resin;
(c) 1 to 10% curing agent;
(d) 5 to 30% core shell rubber;
(e) 1 to 10% nitrile rubber-modified epoxy resin; and
(f) 5 to 10% inorganic filler.

In a second aspect, the present invention provides a method of bonding two surfaces which comprises: applying an adhesive composition according to the invention in its first aspect to a first surface; contacting the adhesive composition applied to the first surface with a second surface; and curing the adhesive composition.

In general terms, 95% cure defines an epoxy resin containing composition in which a sufficient majority of the reactive sites have been consumed so that the mechanical performance and thermal resistance of the cured composition is within the desired characteristic range for that composition to provide the desired mechanical and chemical performance properties. It is possible to expend additional time and energy to obtain the final 5% of cure but this will not result in a significant mechanical or thermal improvement. Differential Scanning calorimetry (DSC) is utilized to monitor the time to reach 95% cure. To measure the degree of cure using Digital Scanning calorimetry the heat released during the curing reaction is related to the total heat for fully curing. This can be measured as follows. A reference resin sample is heated from 10° C. to 250° C. at 10° C./minute rate to full cure (100%) and the generated heat ΔHi is recorded. The degree of cure of a particular resin sample of the same composition as the reference resin sample can then be measured by curing the sample to the desired temperature and at the desired rate and for the desired time by heating the sample at these conditions and measuring the heat ΔHe generated by this cure reaction. The degree of cure (Cure %) is then defined by:

$$\text{Cure \%} = [(\Delta Hi - \Delta He)/\Delta Hi] \times 100 [\%]$$

where ΔHi is the heat generated by the uncured resin heated from 10° C. up to fully cured at 250° C. and ΔHe the heat generated by the certain degree cured resin heated up to a desired temperature and rate.

We have found that the adhesive compositions according to the present invention provide at least 95% of cure in under 2.5 minutes at 170° C. with a cured Tg (peak loss modulus) of over 120° C. and a retained Tg of over 100° C. after hot wet aging in water at 70° C. for 14 days, whilst having desired mechanical properties for structural applications.

In an embodiment, the adhesive composition is 95% cured at a temperature of 140° C. to 170° C. for up to 60 minutes, preferably no more than 45 minutes. In further embodiments, the adhesive composition is 95% cured at a temperature of 150° C. to 160° C. for up to 20 minutes, or 160° C. to 170° C. for up to 10 minutes, or any combination thereof. The adhesive composition may be cured at a temperature of approximately 170° C. for up to 5 minutes, preferably no more than 2.5 minutes.

In an embodiment, at least one of the first and second surfaces is a metal surface. The metal surface may be an oily steel or oily galvanized steel surface. In a further embodiment, both the first and the second surface is a metal surface. In another embodiment, at least one surface is a non-metallic surface, such as a surface of a composite material, plastic, wood, rubber or the like.

In another aspect, the present invention provides a bonded article obtainable by a method according to the invention in its second aspect. The bonded article may consist entirely of metal, except for an adhesive bond layer. In such cases, a first metal surface is bonded to a second metal surface using a layer of the adhesive composition. In another embodiment, the bonded article may consist of a metal and a composite material, such a prepreg or semipreg. In this case, a metal surface may be bonded to the composite material using a separate layer of the adhesive composition. In another embodiment, the adhesive composition may form a part of the composite material, such that the composite material may be placed directly upon the metal surface and cured in situ by heating the metal and/or the composite material.

In an embodiment, the cured adhesive bond between the first surface and the second surface of the bonded article has a lap shear strength of between 20 and 40 MPa for a steel to steel bond. Steel to steel lap shear strength may be measured in accordance with BS EN2243-1: 2005, which is available from the British Standards Institution, 389 Chiswick High Road, London, W4 4AL, United Kingdom, ISO 204: 2009 and/or ISO 527-2:2012, which are available from the International Organization for Standardization, ISO Central Secretariat, Chemin de Blandonnet 8, CP 401-1214, Vernier, Geneva, Switzerland. In further embodiments, the adhesive bond may have a steel to steel lap shear strength of between about 22 to 35 MPa, or 25 to 35 MPa, or 25 to 30 MPa, or any combination thereof.

In another embodiment, the cured adhesive has an initial cured Tg (peak loss modulus, E" Tg) of 70 to 160° C. In further embodiments, the adhesive bond has an initial cured Tg in any one of the ranges of 80 to 150° C., 90 to 145° C., or 100 to 140° C., or any combination thereof.

The percentage cure (cure %) is measured in accordance with the method as described above. The cured Tg is measured in accordance with ASTM D7028-7(2015) (Standard Test Method for Glass Transition Temperature (DMA Tg) of Polymer Matrix Composites by Dynamic Mechanical Analysis (DMA)), which can be obtained from ASTM International, 100 Barr Harbor Drive, PO Box C700, West Conshohocken, Pa., 19428-2959, USA. The wet Tg or retained Tg following hot wet aging is measured following isothermal curing at 150° C. for 15 minutes with no post-cure of the neat adhesive composition and exposing the cured composition to water at 70° C. for 14 days, and then measuring the Tg of the sample using the same measurement standard ASTM D7028. The retained Tg is expressed as a percentage of the (wet Tg/initial cured Tg)×100.

In an embodiment, the cured adhesive has a Tg retention of at least 60% after hot wet aging at 70° C. for 14 days. Hot wet aging may be carried out by full immersion of DMA specimens in water at 70° C. for up to 2 weeks in the manner described above. The percentage of retained Tg after hot water aging is curative dependent. In adhesive compositions comprising dicyandiamide as a curative, for example, the cured adhesive may have a Tg retention of 60 to 75%, 65 to 75%, 70 to 70% or 72.5 to 75% after hot wet aging at 70° C. for 14 days. In adhesive compositions comprising curatives other than dicyandiamide, the cured adhesive bond may have a Tg retention of at least 75%, 77.5%, 80%, 82.5%, 85%, 87.5% or 90% after hot wet aging at 70° C. for 14 days.

In a further aspect, the present invention provides the use of an adhesive composition according to the invention in its first aspect for bonding a composite material to a metal surface.

In an embodiment, the composite material is a prepreg comprising a fibrous reinforcement and an epoxy resin composition.

In another aspect, the present invention provides a composite material comprising an adhesive composition according to the invention in its first aspect and a reinforcing material. The reinforcing material may be a fibrous material. The fibrous material may be in the form of multiple fibre tows each containing multiple fibre filaments to form each tow. The tows may be stitched or woven to form a fabric.

In an embodiment, the fibres may consist of natural materials, such as cotton, flax, hemp, wool, silk, glass fibres, carbon fibres, mineral fibres, etc., semi-synthetic materials, such as rayon, viscose, modal, etc., or synthetic materials, such as carbon, polyester, nylon, acrylic, synthetic glass, etc.

In an embodiment, the reinforcing material may be in the form of non-woven fibrous material such as a veil or a discontinuous fibre fleece, Suitable glass and carbon or metal-coated carbon veils are commercially available under the trade name Optiveil® from Technical Fibre Products Limited, Burnside Mills, Kendal, Cumbria, United Kingdom.

In certain applications, the reinforcing material may act as a support for the adhesive composition, as well as providing other functional or structural benefits, The reinforcing material may act not only as a support for the adhesive composition but also to control the thickness of the adhesive layer so as to ensure that an optimum minimum bondline thickness of the adhesive composition is present between the two surfaces to be bonded.

The reinforcing material may also improve the flow of the adhesive composition during curing of the adhesive composition and/or it may improve handling.

In the foregoing embodiments, it is important that the reinforcing material, whether in the form of a veil, fleece, fabric or otherwise, should not interfere to any significant extent with the adhesive properties of the composition.

In a further aspect, the present invention provides a prepreg comprising the adhesive composition according to the present invention in its first aspect combined with a reinforcing material. The reinforcing material may be a fibrous material, such as fibres or fabric, of the kind hereinbefore described.

The term "prepreg" is commonly used to refer to fibrous reinforcing material as described above which is impregnated or in combination with a resin in the uncured state and is ready for curing by the application of heat and/or pressure. In the context of this application the resin may be formed by the adhesive composition. The resin may be tacked to the surface of the fibrous material to form the prepreg or the resin may partially or completely impregnate the fibrous material.

In an embodiment, the resin impregnates the fibrous material so as to provide a pathway to facilitate the removal of air or gas during processing of the prepreg material.

Various methods have been proposed for the production of prepregs on an industrial scale, one of the preferred methods being the impregnation of a moving fibrous web with a liquid, molten or semi-solid uncured thermosetting resin. The prepreg produced by this method may then be cut into sections of the desired length and a stack of the sections cured by heating often in combination with a moulding pressure to produce the final fibre reinforced laminate.

Curing may be performed in a vacuum bag which may be placed in a mould for curing as is preferred in the manufacture of wind energy structures such as shells for the blades and spars. Alternatively, the stack may be formed and cured directly in a mould.

In another aspect, the present invention provides the use of an adhesive composition according to the invention in its first aspect for the preparation of a part, such as a preformed part. In an embodiment, the part may be an automobile part that is prepared or supplied ready to be structurally bonded to another automobile part. The automobile part may be a first metal part that has already been stamped or pressed and to which a layer of the adhesive composition has been applied. The adhesive layer may be contacted with a second metal part or a prepreg or other composite structure and cured thereby joining the first and second parts together. In another embodiment, the part may be a part of a wind turbine structure or an aerospace industry structure.

In another aspect, the present invention provides the use of an adhesive composition according to the invention in its first aspect for the preparation of an industrial blank. In an embodiment, the blank may be a steel sheet or a section or panel of a steel sheet to which a layer of the adhesive composition has been applied. The adhesive coated blank may then be subjected to stamping or pressing or cutting to form a part suitable for use in the automotive industry or for the manufacture of a wind turbine structure.

EXAMPLES

Example 1

Adhesive composition 1 was prepared from 10 g KSR-177 (a silane-modified epoxy resin manufactured by Kukdo Chemical Company Limited, Seoul, South Korea), 5 g Struktol® Polydis® 3611 (a CTBN rubber manufactured by Schill and Seilacher "Struktol" GmbH, Hamburg, Germany), 12 g Araldite® GT6099 (a Type 9 Bisphenol A epoxy resin manufactured by Jubail Chemical Industries Co. (JANA), Jubail, Saudi Arabia), 21 g Kane-Ace® MX-153 (a core shell rubber tougher manufactured by Kaneka Corporation, Tokyo, Japan), 35 g YDPN-638 (a phenol novolac epoxy resin manufactured by Kukdo Chemical Company Limited, Seoul, South Korea), 8 g Minfil L50 BT (a calcium carbonate filler manufactured by Omya UK Limited, Royston, Herts, UK), 5 g Dyhard® 100E (a dicyandiamide curing agent manufactured by Alzchem Group Ag, Trostberg, Germany) and 4 g Omicure® U52M (a curing agent manufactured by Emerald Performance Materials, Moorefield, N.J., USA).

Adhesive composition 2 was prepared from 10 g KSR-177 (a silane-modified epoxy resin manufactured by Kukdo Chemical Company Limited, Seoul, South Korea), 5 g Struckol@ Polydis® 3611 (a CTBN rubber manufactured by Schill and Seilacher "Struktol" GmbH, Hamburg, Germany), 12 g Araldite® GT6099 (a Type 9 Bisphenol A epoxy resin manufactured by Jubail Chemical Industries Co. (JANA), Jubail, Saudi Arabia), 21 g Kane-Ace® MX-153 (a core shell rubber tougher manufactured by Kaneka Corporation, Tokyo, Japan), 35 g XD1000 (a dicyclopentadiene novolac epoxy resin manufactured by Nippon Kayaku, KK, Tokyo, Japan), 8 g Minfil® L50 BT (a calcium carbonate filler manufactured by Omya UK Limited, Royston, Herts., UK), 5 g Dyhard® 100E (a dicyandiamide curing agent manufactured by Alzchem Group Ag, Trostberg, Germany) and 4 g Omicure® U52M (a curing agent manufactured by Emerald Performance Materials, Moorefield, N.J., USA).

Samples of adhesive composition 1 and adhesive composition 2 were used to bond samples of galvanized steel to galvanized steel and the resultant lap shear strength (MPa) measured according to BS EN2243-1: 2005. Curing of the adhesive compositions was carried out at 150° C. for 15 minutes with no post-cure period.

Initial glass transition temperature (peak loss modulus, E" Tg) and hot wet aged glass transition temperature (peak loss modulus, HW Aged E" Tg) values were measured in accordance with ASTM E1640-13 on a TA Q800 DMA Instrument manufactured by TA Instruments, 159 Lukens Drive, New Castle, Del. 19720, USA, using a heating rate of 5° C./minute from 40° C. to 180° C. Hot wet aging was carried out by full immersion of the DMA specimens in water at 70° C. for 14 days.

Adhesive composition 1 showed a lap shear strength of 27.5 MPa on clean galvanized steel and 27.7 MPa on oily galvanized steel, with an initial cured E" Tg on clean steel of 100° C. Adhesive composition 1 showed an E" $T_g$ retention of 80% after hot wet aging.

Adhesive composition 2 showed a lap shear strength of 31 MPa on clean galvanized steel and 31.5 MPa on oily galvanized steel, with an initial cured E" Tg on clean galvanized steel of 140° C. Adhesive composition 2 showed an E" Tg retention of 77% after hot wet aging.

Example 2

Adhesive composition 2 was prepared as in Example 1.

Adhesive composition 3 was prepared from 10 g KSR-177 (a silane-modified epoxy resin manufactured by Kukdo Chemical Company Limited, Seoul, South Korea), 5 g Flexibilizer® XB3333 (a polyurethane toughening adduct manufactured by Huntsman Corporation, Texas, USA), 12 g Araldite® GT6099 (a Type 9 Bisphenol A epoxy resin manufactured by Jubail Chemical Industries Co. (JANA), Jubail, Saudi Arabia), 21 g Kane-Ace® MX-153 (a core shell rubber tougher manufactured by Kaneka Corporation, Tokyo, Japan), 35 g XD1000 (a dicyclopentadiene novolac epoxy resin manufactured by Nippon Kayaku, KK, Tokyo, Japan), 8 g Minfil L50 BT (a calcium carbonate filler manufactured by Omya UK Limited, Royston, Herts, UK), 5 g Dyhard® 100E (a dicyandiamide curing agent manufactured by Alzchem Group Ag, Trostberg, Germany) and 4 g Omicure® U52M (a curing agent manufactured by Emerald Performance Materials, Moorefield, N.J., USA).

Samples of adhesive composition 2 and adhesive composition 2 were used to bond samples of clean galvanized steel to clean galvanized steel and the resultant lap shear strengths and initial cured and hot wet aged E" Tg values were determined in the same manner as in Example 1.

Adhesive composition 2 showed a lap shear strength of 31 MPa on clean galvanized steel with an initial cured E" Tg on clean galvanized steel of 140° C. Adhesive composition 2 showed an E" Tg retention of 77% after hot wet aging.

Adhesive composition 3 showed a lap shear strength of 34 MPa on clean galvanized steel with an initial cured E" Tg on clean galvanized steel of 130° C. Adhesive composition 2 showed an E" Tg retention of 78% after hot wet aging.

The adhesive compositions according to the present invention shows good steel to steel and oily steel bonding and desirable initial cured E" Tg values with good Tg retention after hot water aging, even in the absence of CTBN rubber modifiers.

The invention claimed is:

1. An adhesive composition which comprises, by total weight of the composition:
    (a) 1 to 15% of a silane-modified epoxy resin, comprising an alkoxy- or alkoxysilane-modified epoxy resin, having an expoxy-equivalent weight of 170 to 1,000 g/eq.;
    (b) 20 to 60% dicyclopentadiene novolac epoxy resin, having an expoxy equivalent weight of approximately 200 to 300 g/eq. and a softening point of 60 to 90° C.;
    (c) 1 to 10% curing agent comprising dicyandiamide.
    (d) 5 to 30% core shell rubber;
    (e) 1 to 10% nitrile rubber-modified epoxy resin; and
    (f) 5 to 10% inorganic filler which is an oil absorbent.

2. The method of bonding two surfaces comprising:
    applying an adhesive composition as claimed in claim 1 to a first surface;
    contacting the adhesive composition applied to the first surface with a second surface, said second surface being oily steel or oily galvanized steel; and
    curing the adhesive composition at a temperature of 140° C. to 170° C. for no more than 60 minutes.

* * * * *